UNITED STATES PATENT OFFICE.

HELFRIED BARON KAISERSTEIN, OF VIENNA, AUSTRIA-HUNGARY.

PROCESS OF PREPARING FOOD FOR HORSES.

SPECIFICATION forming part of Letters Patent No. 520,682, dated May 29, 1894.

Application filed August 11, 1893. Serial No. 482,930. (No specimens.) Patented in Austria-Hungary March 20, 1893, No. 705 and No. 18,357.

*To all whom it may concern:*

Be it known that I, HELFRIED BARON KAISERSTEIN, a subject of the Emperor of Austria-Hungary, and a resident of the city of Vienna, Austria-Hungary, have invented a certain new and useful Improved Process of Manufacturing Food for Horses, (for which I have obtained Letters Patent in Austria-Hungary, dated March 20, 1893, No. 705 and No. 18,357,) of which the following is a specification.

My invention relates to an improved process of manufacturing food for horses, &c.

The article of food made according to this invention consists mainly of three constituents, viz., blood, extract of meat and a substance such as Iceland moss.

The three constituents used in this process are prepared as follows: The blood to be used for the purposes of the present invention has to be taken of sound animals, preferably oxen, and has to be freed from any particles of fibrin, by passing it through very fine sieves or linen. It is then mixed with two per cent. of pure pepsin and one tenth per cent. of pure hydrochloric acid previously diluted with water and thoroughly stirred until the ingredients are completely incorporated. The mixture is then kept for about eight hours at a temperature of about 37° centigrade and is repeatedly stirred during this time.

The meat to be used for the purposes of the present invention is first freed from any fat, bones, sinews, &c., and is then thoroughly beaten with a heavy hammer on a hard wooden block. For performing this latter operation machines used in making sausage-meat may be employed if desired. One part by weight of this mass of meat is then placed in two parts by weight of water into which three per cent. by weight—of the meat—of dried melon-leaves and one tenth per cent. by weight—of the meat—of pure hydrochloric acid are stirred. This steeped mass of meat is left to itself for eight hours and is then placed in a boiler so arranged as to allow an exact regulation of the heat. In this boiler the mass of meat is very slowly and gradually heated to a boiling heat, it being preferred to proceed in such a manner that it takes at least eight hours from the beginning of the heating until the boiling heat is reached, the boiling proper being continued for half an hour only. During the heating and boiling the steeped mass of meat has to be stirred repeatedly. Then the broth is separated from the solid refuse matter by filtering through linen and the solid matter is pressed to yield its last fluid contents. Thus a liquid extract of meat is produced.

The third constituent to be used for the purpose of this invention is the Iceland moss. The Iceland moss contains a bitter matter and an extractive coloring matter; the removal of the former is absolutely necessary, the removal of the latter is desirable for the purposes of this invention. For the purpose of entirely removing the bitter matter and partly the extractive coloring matter a solution of potash is used. A tank having a capacity of about one hundred liters is filled with-seventy liters of water to which one hundred and eighty-eight grams of potash are added and the whole is thoroughly stirred. These quantities of water and potash are sufficient for removing the bitter matter from about three kilograms of Iceland moss. The latter is, before being placed into the potash solution, cleaned from dust and sand by washing with fresh water, and any foreign vegetable matter is also removed therefrom. The Iceland moss thus cleaned is freed from the washing water by pressing before it is placed into the potash solution where it remains for twenty four hours being repeatedly stirred during this time. Then it is removed from the potash solution and washed twice with fresh water in order to remove any potash solution therefrom. The potash solution has absorbed all bitter matter and almost all extractive coloring matter. The Iceland moss thus prepared is now spread on boards until it is fully dried.

The three contituents: blood, extract of meat, and Iceland moss are combined in the following manner: Two parts of the blood prepared as hereinbefore described are intimately mixed with one part of the extract of meat prepared as hereinbefore described and to this mixture the Iceland moss prepared as hereinbefore described is added in the proportion of one kilogram of Iceland moss to three liters of the liquid mixture. The Iceland moss completely saturated with the liquid is then spread on boards and dried for from twelve to fourteen hours in a well ventilated drying chamber. After drying, the mixture is so hard and brittle that it can be ground to powder in which form it can be packed ready for the market. When this powder has to be used as a food for horses it is added to the moistened oats or bran or other usual food for the horse, and in this form it is readily taken by all horses.

Horses fed with the food to which this powder is added improve in appearance and require less food, as this powder improves the digestion, their elasticity is highly increased and the results obtained by them, particularly on the race ground, are notably better than without the use of this powder.

Instead of Iceland moss common chaff or chopped straw may be used which has been prepared in the same way as has been hereinbefore described for the Iceland moss and which is mixed in the same way with blood and liquid extract of meat prepared as herein described. By using chaff as a substitute for Iceland moss an excellent substance for increasing the strength of horses is obtained although I use Iceland moss by preference.

I claim—

A process of manufacturing a new food product for horses consisting in preparing blood by freeing it from fibrin, mixing this with pepsin and hydrochloric acid and maintaining this mixture at a gentle heat for several hours, preparing an extract of meat by steeping, boiling and filtering meat, preparing a material such as Iceland moss, by freeing it from unsuitable constituents by boiling with a solution of potash, and making a mixture of the blood, extract of meat and the material such as Iceland moss, thus prepared, substantially as set forth.

In testimony whereof I have affixed my signature in presence of two witnesses.

HELFRIED BARON KAISERSTEIN.

Witnesses:
FROHMAND EURICH,
V. BELMONT.